July 25, 1939. A. E. LARD Re. 21,162

REBOUND CHECK FOR GOLF CLUB SHAFTS

Original Filed Nov. 30, 1936

Inventor
A. E. Lard

By Mason Fenwick & Lawrence
Attorneys

Reissued July 25, 1939

Re. 21,162

UNITED STATES PATENT OFFICE 21,162

REBOUND CHECK FOR GOLF CLUB SHAFTS

Allan E. Lard, Washington, D. C.

Original No. 2,078,728, dated April 27, 1937, Serial No. 113,510, November 30, 1936. Application for reissue September 15, 1938, Serial No. 230,164

14 Claims. (Cl. 273—80)

This invention relates to tubular steel-shafted golf clubs, and particularly to clubs of the "irons" type. It is a well known fact that steel-shafted "irons" tend to impart to the fingers, upon impact with the ball, an unpleasant or stinging sensation which is not present in the hickory shaft. This undesirable feature in the steel shaft is due to the excess speed of the rebound or reaction vibration of the steel shaft over hickory, and particularly to the first rebound after impact of the blade with the ball. Said impact flexes the steel shaft backwardly and an almost instantaneous rebound occurs, and it is the force and speed of this rebound or its reaction rebound or rebounds that cause the aforesaid unpleasant or stinging sensation.

The main object of this invention is to eliminate this objectionable feature in the steel golf shaft.

In the drawing which accompanies and forms a part of the following specification and throughout the several figures of which the same characters of reference have been employed to designate identical parts, Figure 1 is a view in elevation of the front side of a steel golf club;

Figure 1:
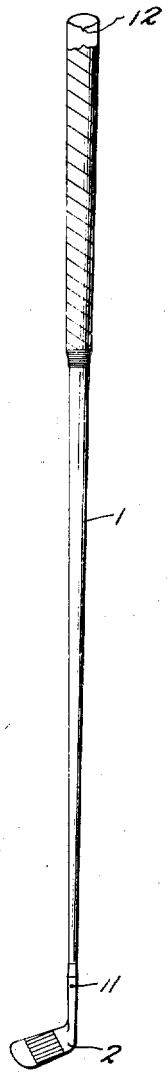

Referring now in detail to the several figures, the numeral 1 represents in general a tubular tapered steel golf shaft, about 36 inches long, of the usual type having a midiron 2 attached thereto. A light wooden dowel 3 preferably of pine and about 20 inches long is turned to fit the internal wall of the shaft 1, a slight tolerance being left for a purpose hereinafter described, the dowel extending for a distance of approximately 20 inches from the small end of the shaft. The dowel may be made tapered and then slitted as indicated at 4 in Figures 2 and 3, with a thin slitting saw, for example one .009 inch thick, to within 2 inches of the small end, the dowel being trued up circularly, or it may be made of two half-round ½ inch sections 15 and 16, as shown in Figure 5, the head ends of which are glued together for a distance of about 2 inches as at 17 and then turned to fit in the internal wall, the half-rounds being pinned together to facilitate the turning operation, said pins being subsequently withdrawn.

By either method of construction the dowel is formed approximately 20 inches long having two prongs 5 and 6, 18 inches long extending up from the small end, both prongs having opposing flat faces which bear on each other and have a relatively sliding movement under the flexure and rebound of impact.

Figure 2:
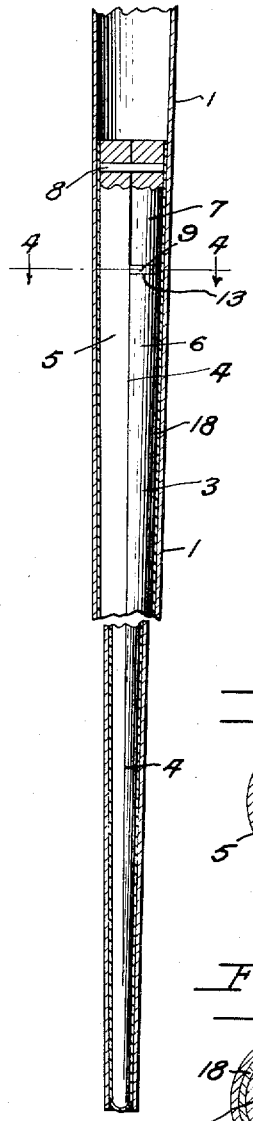
Figure 2 is a longitudinal section through the shaft showing the vibration absorbing member in its maximum state of displacement, the shaft being in rectilinear position, said member being slit.

About one inch from the upper end of one of the prongs, of either construction, for example the prong 6 in Figure 2, is sawed off with a saw $\frac{1}{16}$ of an inch in width and the sawed-off section 7 is glued to the opposite prong, in its original relation to the same, and additionally secured with tight-fitting wood pegs 8 dipped in glue. There is now a space of $\frac{1}{16}$ inch (width of the saw) between the end of the short prong 6 and its sawed-off section 7. A rubber half-disk 9 is provided, about ⅛ inch thick in its relaxed state. The dowel is flexed backwardly to the extent of the maximum flexure of a full shot and it is preferably steamed and set in this bowed position. The backward flexing of the dowel increases the $\frac{1}{16}$ inch wide space or slot to about ⅛ inch in width by the relative sliding movement which takes place between the flat abutting surfaces of the prongs 5 and 6. The rubber half-disk is inserted in said space or slot while the latter is thus spread, the thickness of the rubber being about the same width as the slot while the latter is in extended position. The diameter of the rubber half-disk 9 is made slightly less than the diameter of the half-round end of the short prong 6 to provide room for the displacement of the rubber half-disk as shown at 9a in Figure 3.

Figure 5:
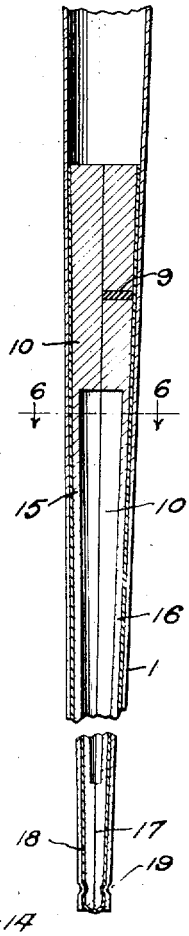
Figure 5 is a longitudinal section showing a modified form of dowel, made from two half round sections.
Figure 4:
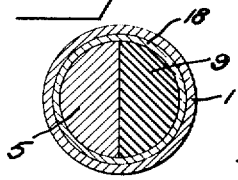
Figure 4 is a cross section taken along the line 4—4 of Figure 2.
Figure 6:
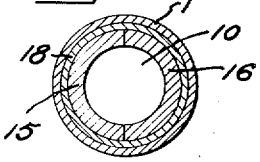
Figure 6 is a cross section taken along the line 6—6 of Figure 5.

In that form of the invention shown in Figures 5 and 6, the two half-round sections of the dowel may be hollowed out as indicated at 10 to within about 2 inches of the top. This reduces the weight. When two halves are employed the hollowing is a fast manufacturing operation.

In either form of the invention, the split dowel is inserted in the tubular steel shaft with the convex side of the half-disk 9 toward the front and it is pushed into the shaft so as to make a snug fit with the inner wall of the shaft, but not so tight as to prevent the abutting faces of the split from sliding relative to one another. The dowel preferably terminates at the end of the shaft and is retained in place by a circumferential crimp 19 pressed into the shaft and entering the wood. After the dowel has been steamed and set in bowed shape as described, it acquires an inherent stress when forced into the shaft which provides an additional resistance to the rebound. The shaft is inserted in the hose 1 of the head 2 in such a manner that the rubber half-disk faces in the direction of that side of the head which contacts the ball, and is pinned with the usual rivet 11. Since, at the time the assemblers receive the tubular shaft the dowel is concealed therein, it is essential that the shaft be marked in some way so that the shaft can be secured to the head in proper relation with respect to the front or disk side and the striking face. The front or disk side may be readily indicated by a V-notch 12, Figure 1, or other suitable index, filed in the upper end of the shaft, the leather grip being partly removed to show the same.

Figure 3:
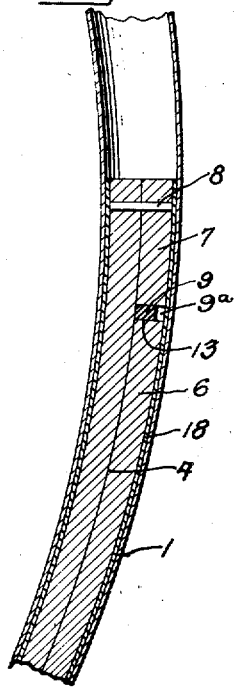
Figure 3 is a similar view to Figure 2 the lower part being omitted and the shaft being shown in the flexed position upon impact with the ball showing the rubber vibration absorber in relaxed position.

Upon impact with the ball the shaft is flexed backwardly as in Figure 3 and an almost instantaneous rebound occurs as before stated. This rebound is checked by the end 13 of the short prong 6 with its piston-like action, moving against the rubber half-disk and forcing said disk into displaced position against a thin rubber sock 18 drawn over the dowel to prevent the same rattling against the wall of the shaft in the event the dowel should shrink. This rubber sock also provides rubber which can be displaced. The normal length of the sock is about 10 inches and is stretched to cover the length of the entire dowel. When the shaft on its first rebound attains its normal straight position, the rubber half-disk is flush with the outside surface of the dowel and therefore pressing against the sock 18. Rubber, while displaceable under pressure, is incompressible, so that whatever rebound is still in the shaft in excess of that which was checked by the resistance of the rubber half-disk to displacement, is now further checked by the displacement of the sock 18 in contact with the half-disk. All rebounds, reactions or vibrations after impact are, therefore checked, thus reducing or nullifying the former vibrations of the steel shaft.

Figure 7:
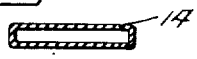
Figure 7 is a cross section through a modified form of vibration absorber.
Figure 8:
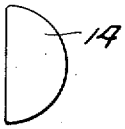
Figure 8 is a plan view of the same.

Figures 7 and 8 show that instead of employing a solid piece of rubber for the half-disk, I may substitute a cloth covered rubber bag 14 filled with air, preferably slightly compressed and sealed. The end thrust of the short prong 6 compresses the air in the bag and thus checks the rebounds of the shaft in play, the internal wall of the shaft and the slot 13 forming a container for said bag.

As has been previously stated, the wooden dowel should be inserted firmly in place in the steel shaft, but not with sufficient pressure to prevent the flat faces of the split dowel from sliding against one another.

The present invention does not confine the construction of the dowel to wood. I may employ any suitable composition material or metal, such as aluminum. Neither is it essential that the shaft be tapered, for if desired, a shaft and dowel that are not tapered may be employed.

While I have in the above disclosure described what I believe to be the preferred and practical forms of my invention, it will be understood to those skilled in the art that the details of construction as shown and described are by way of example and not to be construed as limiting the scope of the invention as claimed.

What I claim is:

1. In a golf club, a tubular steel golf shaft, a split member inserted in said shaft, and a rubber bumper coacting with said member to resist the piston-like movement of said member thereby acting to check the rebounds of said golf shaft in play, said split member being provided with a recess expansible in width under flexion of said member and flexed backwardly to receive said rubber bumper.

2. In a golf club, a tubular steel golf shaft, a split member inserted in said shaft, said member having two prongs having relative sliding movement under flexions of said shaft, a rubber bumper between said prongs, said prongs coacting through the intermediary of said bumper to check the rebounds of said shaft in play.

3. In a golf club, a tubular steel golf shaft, a split member inserted in said shaft, one of the parts of said member defined by said split comprising a prong with a piston-like movement relative to the other part of said member, a resisting rubber element between the parts of said split member and which the end portion of said prong impacts, acting to check the rebounds of said shaft in play, said rubber element being provided with room for limited displacement under end pressure from said prong.

4. In a golf club, a tubular steel golf shaft, a two-piece member inserted in said shaft, one of the pieces of said member comprising a prong with a piston-like movement, a resisting rubber element which the end portion of said prong impacts acting to check the rebounds of said shaft in play, said rubber element being provided with room for limited displacement under pressure.

5. In a golf club, a tubular steel golf shaft, a two-piece member inserted in said shaft, one piece of said member constituting a prong with a piston-like movement, a flexible bag of air between the end of said prong and the other part of said member acting to check the rebounds of said shaft in play.

6. In a hollow resilient golf club shaft, a rebound check extending through a substantial length of said shaft and making firm contact with the surface thereof, comprising a member of circular cross section longitudinally divided by a split of no width, from a point a short distance from the end of the member adjacent the head of the club to a point a short distance from the end of said member remote from the head of said club, and being transversely divided adjacent the end of said split remote from said head and to one side of said split, by a slot of appreciable width, the said split and slot dividing said member into long and short prongs having their proximate ends in confronting relation, and coacting as a piston and an abutment, moving within the range of the width of said slot under variations in the relative sliding movement of said prongs produced by bound and rebound of said shaft, and a rebound checking element confined in said slot.

7. In a hollow resilient golf club shaft as claimed in claim 6, a layer of rubber between said member and the interior wall of said shaft.

8. In a hollow resilient golf club shaft as claimed in claim 6, said member being hollow at some distance below the diametrical plane of said slot.

9. In a hollow resilient golf club shaft as claimed in claim 6, said rebound checking element comprising a flexible capsule filled with air.

10. In a hollow resilient golf club shaft as claimed in claim 6, the member of circular cross section being made of wood.

11. In a hollow resilient golf club shaft as claimed in claim 6, the member of circular cross section being made of wood steamed and set into a bowed shape with its convex side facing the same direction as the convex side of said rebound checking element and inserted in said shaft with its convex side facing the front of said shaft whereby an inherent rebound-resisting stress is set up in said member.

12. In a hollow resilient golf club shaft as claimed in claim 6, the member of circular cross section extending to a point adjacent the lower end of said shaft, the metal of the latter near said end being crimped circumferentially into the substance of said member for holding it in place.

13. In a hollow resilient golf club shaft as claimed in claim 6, including a rubber sock on said member forming a thin rubber layer between said member and the inner wall of said shaft, against which the rebound checking member presses in the course of its displacement, displacing the rubber of said sock.

14. In a golf club, a hollow resilient shaft, a flexible member having a bowed shape when in unstressed state inserted in said shaft under straightening stress with the convex side facing the front of said shaft whereby an inherent rebound-resisting stress is set up in said shaft.

ALLAN E. LARD.